(12) United States Patent
Barezzani et al.

(10) Patent No.: US 8,276,430 B2
(45) Date of Patent: Oct. 2, 2012

(54) HYDRAULIC PRESSING AND/OR CUTTING TOOL AND MECHANISM FOR CONVERTING A ROTARY MOTION INTO A TRANSLATIONAL OSCILLATING MOTION FOR THIS TOOL

(75) Inventors: Gualtiero Barezzani, Concesio (IT); Cesare Braga, Brescia (IT)

(73) Assignee: Cembre S.p.A., Brescia (IT)

( * ) Notice: Subject to any disclaimer, the term of this patent is extended or adjusted under 35 U.S.C. 154(b) by 638 days.

(21) Appl. No.: 12/440,684

(22) PCT Filed: Sep. 11, 2006

(86) PCT No.: PCT/IT2006/000654
§ 371 (c)(1),
(2), (4) Date: Mar. 27, 2009

(87) PCT Pub. No.: WO2008/032341
PCT Pub. Date: Mar. 20, 2008

(65) Prior Publication Data
US 2010/0000288 A1    Jan. 7, 2010

(51) Int. Cl.
| H01R 43/00 | (2006.01) |
| F16H 21/00 | (2006.01) |
| B25B 28/00 | (2006.01) |
| B21J 9/18 | (2006.01) |
| B21D 17/02 | (2006.01) |

(52) U.S. Cl. .............. 72/453.15; 72/453.03; 72/449; 72/414

(58) Field of Classification Search ........... 72/412–416, 72/453.01, 453.03, 453.15, 449, 407, 409, 72/409.1; 74/23, 24, 25, 55, 57; 475/331
See application file for complete search history.

(56) References Cited

U.S. PATENT DOCUMENTS
| 643,339 | A | * | 2/1900 | Thompson et al. ............. 72/412 |
| 843,659 | A | * | 2/1907 | Baumann ........................ 72/371 |

(Continued)

FOREIGN PATENT DOCUMENTS
WO    WO 97/10908    3/1997

(Continued)

OTHER PUBLICATIONS

Engineering Encyclopedia, Edited by Franklin D. Jones and Paul B. Schubert 3rd edition, The industrial Press, 93 Worth Street, New York 13, N.Y., Machinery Publishing Co., LTD National House, West Street, Briton 1, England. pp. E-458, E459, P966, P967.*

(Continued)

*Primary Examiner* — Edward Tolan
*Assistant Examiner* — Lawrence J Averick
(74) *Attorney, Agent, or Firm* — Dickstein Shapiro LLP (57) ABSTRACT

A hydraulic pressing and/or cutting tool (1) comprises an electric motor (6), a converting mechanism (8) suitable to convert the rotary motion of the motor (9) to an oscillating translational motion, a hydraulic pump (11) suitable to carry out, in response to the oscillating translational motion, an increase in the pressure of a pressure fluid acting on an operating piston (12) such that the operating piston (12) is displaced, a stationary jaw (13) and a movable jaw (14) connected to the operating piston (12) such that, in response to the displacement of the operating piston (12), the movable jaw is displaced to the stationary jaw (13) to carry out pressing or cutting operations. The converting mechanism (8) comprises an epicycloidal gear (16) and a thrust unit (17) co-axial with the epicycloidal gear (16).

13 Claims, 11 Drawing Sheets

U.S. PATENT DOCUMENTS

| | | | | |
|---|---|---|---|---|
| 2,257,623 | A * | 9/1941 | Skoglund | 72/437 |
| 2,656,745 | A * | 10/1953 | Forichon | 72/19.9 |
| 3,066,555 | A * | 12/1962 | Burnel | 72/76 |
| 3,527,121 | A * | 9/1970 | Moore | 475/338 |
| 3,760,676 | A | 9/1973 | Daniels | |
| 4,453,898 | A * | 6/1984 | Leka et al. | 417/521 |
| 4,485,843 | A * | 12/1984 | Wolff | 137/514 |
| 4,566,858 | A * | 1/1986 | Akiba | 417/22 |
| 4,753,581 | A * | 6/1988 | Hiscock | 417/539 |
| 5,727,417 | A * | 3/1998 | Moffatt et al. | 72/453.03 |
| 5,768,094 | A * | 6/1998 | Merkel | 361/679.13 |
| 5,988,987 | A * | 11/1999 | Wolcott et al. | 417/54 |
| 6,079,313 | A * | 6/2000 | Wolcott et al. | 92/71 |
| 6,196,045 | B1 * | 3/2001 | Thomas et al. | 72/454 |
| 6,276,186 | B1 | 8/2001 | Frenken | |
| 6,556,865 | B2 * | 4/2003 | Walcott et al. | 607/6 |
| 6,760,621 | B2 * | 7/2004 | Walcott et al. | 607/6 |
| 7,762,795 | B2 * | 7/2010 | Moubayed | 417/477.3 |
| 7,818,864 | B2 * | 10/2010 | Wilkinson et al. | 29/428 |
| 2002/0151405 | A1 * | 10/2002 | Futterer | 475/331 |
| 2003/0125158 | A1 * | 7/2003 | Flamang | 475/331 |
| 2003/0153427 | A1 * | 8/2003 | Mayranen | 475/331 |

FOREIGN PATENT DOCUMENTS

WO     WO 03/084719     10/2003

OTHER PUBLICATIONS

Engineering Encyclopedia, Edited by Franklin D. Jones and Paul B. Schubert 3rd edition, The industrial Press, 93 Worth Street, New York 13, N.Y. Machinery Publishing Co., LTD National House, West Street, Briton 1, England. pp. E-458, E459, E966, E967 copyright 1963.*

* cited by examiner

HYDRAULIC PRESSING AND/OR CUTTING TOOL AND MECHANISM FOR CONVERTING A ROTARY MOTION INTO A TRANSLATIONAL OSCILLATING MOTION FOR THIS TOOL

The object of the present invention is a hydraulic pressing and/or cutting tool, as well as a mechanism for converting a rotary motion into a translational oscillating motion for this tool.

Motor-driven pressing and/or cutting tools are frequently used to carry out certain connections, such as pressing connectors around electric wires, pressing rivets, or cutting operations, such as cutting electric wires during the installation and maintenance on electric systems.

These tools usually comprise an electric motor that is powered by an accumulator and provided with a drive shaft connected to a converting mechanism, which converts the rotary motion of the drive shaft to a translational oscillating motion that causes, in a hydraulic assembly connected thereto, a pressure increase in a hydraulic liquid that acts on a piston to move the latter against the force of a pressure spring. The piston is, in turn, connected to a movable jaw, such as to displace the latter towards a stationary jaw of the tool during the pressing operation. The jaws can be shaped and/or provided with accessory elements, such that the jaws, by being moved towards each other, allow carrying out the pressing or cutting operation as desired.

According to the fields in which they are mostly used, pressing and cutting tools (hereinafter defined as the "pressing tools") must meet several particular requirements which are difficult to conciliate, and that, as will be illustrated below, still remain unsatisfied by the known tools currently available on the market.

As the pressing tools are very often used outdoors, such as along railways far away from buildings provided with a connection to a power network, they require to have a power source of their own, i.e. a portable electric accumulator either integrated in or applied to the tool. This accumulator supplies a limited amount of electric power which determines the autonomy, i.e. the number of pressing/cutting operations that can be carried out by means of the tool without having to replace the accumulator. In order to maximize the number of executable operations, the energy losses of the tool are required to be as low as possible, and particularly those due to the resistance and friction of the motion converting mechanism. A further requirement results from the fact that pressing operations, particularly those intended to provide connections between connectors and/or electric wires are often uncomfortable due to very narrow space conditions, such as in an electric cabinet or a wiring line connecting a large amount of wires that are very close to each other. Therefore, pressing tools should be necessarily small sized, and have a preferably elongated shape of a reduced side dimension, such that the intervention areas can be easily reached.

Since the size of the hydraulic assembly cannot be reduced beyond the limit defined by the pressing surface of the piston that is required for allowing an increased force and the total travel required for providing the opening and closing travel of the jaws, the overall dimensions of the motion converting mechanism are required to be reduced as much as possible.

A third requirement is being capable of carrying out the pressing and cutting operations with a suitable rapidity, in order to shorten the time required for carrying out the work. Furthermore, a too slow pressing cycle would force the user to hold the tool for too long in a work position that is quite often uncomfortable.

Since a rapid advancement of the movable jaw towards the stationary one can be obtained only by means of a considerable travel or oscillating translation frequency of the motion converting mechanism, a rapid work cycle of the tool is hardly compatible with a reduction in the energy consumption, strength, and frictions of the motion converting mechanism, as well as the overall dimensions thereof.

In this regard, it should be noted that several motion converting mechanisms, which have been provided for pressing tools, have a configuration with a very low resistance and a very low theoretical friction, which however cannot be obtained other than by a perfect mount (with very strict and industrially unacceptable tolerances) and a perfect maintenance of the size and positioning of the movable components of the mechanism throughout a tool's life. In reality, these systems, though working, are subjected to inevitable (initial and assembly) size tolerances, as well as friction and wear, which move the shape and mutual positioning of the movable parts away from the ideal ones, thus generating friction and increasing mechanical resistance values which considerably increase the energy consumption of the tool and determine an undesired short life of the latter.

A known pressing tool (EP 0 944 937) comprises a motion converting mechanism with a drive shaft consisting of a drive shaft of an electric motor, a plurality of rotary bodies, a lower stationary track body and an upper track body that is axially movable but rotatably locked. The rotary bodies, particularly cylindrical rolls, are arranged between the two track bodies and around the drive shaft. To allow for the conversion of the rotary motion of the drive shaft into a translational oscillating motion of the movable track body, the rotary bodies are arranged:

in axial and radial pressing contact with a track formed in the stationary track body;
in radial pressing contact with the drive shaft;
in axial pressing contact with an undulated track formed in the movable track body, such that the rotary bodies provide, on the one side, the satellites of an epicycloidal reduction gear, and on the other side, cam-thrust members that, by their revolution motion, cause the oscillating translational movement of the movable track body.

As the motion converting mechanism performs both functions of reducing the rotary motion and converting the latter into a translational oscillating motion by means of the same rotary bodies, this mechanism has a length which is potentially very reduced. However, due to the number of complicated pressing interactions of the rotary bodies with the other members in the mechanism, an optimum and long-lasting operation of the latter is severely impaired by the inevitable size and assembly tolerances, which cause an imperfect alignment of the axes of rotation of the individual members, frictions and wear that increase the energy losses, and thus the tool electric power consumption.

To avoid these drawbacks, at least partially, the rotating bodies and the other movable members in the mechanism are required to be stiffened and enlarged, with the inevitable consequence that the overall dimensions and the inertia of the motion conversion mechanism are increased, which, in turn, would imply high energy consumption and great side dimensions of the tool.

A further mechanism for converting a rotary motion into a translational oscillating motion has been disclosed with reference to a punch press (U.S. Pat. No. 3,760,676) in which, unlike in hydraulic pressing tools, the translational oscillating motion is directly transmitted to the piece to be punched and no hydraulic pressure increase is required.

This punch press comprises a drive motor that transmits the rotary motion of the drive shaft by means of belts to a flywheel being coupled to a drive shaft that is provided with teeth gearing with a primary gear wheel thereby providing a reduction in the rotary motion. The primary gear wheel is coupled to a shaft, which is rotatably integrally connected to a first track body to be able of rotating the latter. A second undulated track body, which is rotatably locked but axially displaceable, is counter-posed to the first track body. Between the first track body and the second track body, balls are arranged in pressing contact against both track bodies, which act as cam-thrust members. The rotation of the first plate body causes a revolution movement of the balls along the undulated track of the second rotatably locked body, and causes the latter to perform an oscillating axial movement. In this solution, the balls do not contribute to the reduction of rotary motion, and thus are less sensitive to imprecise positioning and wear. However, the reduction gear has too large side dimensions (relative to the longitudinal direction of the reciprocating translational motion) to be used in a portable hydraulic pressing tool. Furthermore, the high side forces (to which a very large and solid structure is counter-posed in the punch press described in U.S. Pat. No. 3,760,676) that are generated by the rotary motion reduction stage prevent this known system from being used in a hydraulic pressing tool in the case where the bulk is desired to be reduced.

The main object of the present invention is thus to provide a small-sized hydraulic pressing tool that allows a reasonably rapid work cycle with a lower energy consumption than using similar known tools.

A further object of the present invention is to provide a hydraulic pressing tool, in which the motion converting mechanism is less sensitive to dimensional tolerances and imperfect mount and which is less subjected to wear.

These and other objects are achieved by means of a hydraulic pressing tool comprising:
  an electric motor to be powered by an accumulator and comprising a drive shaft;
  a converting mechanism connected to the drive shaft and suitable to convert the rotary motion of the drive shaft to an oscillating translational motion;
  a hydraulic unit connected to the converting mechanism and suitable to carry out, in response to the oscillating translational motion, an increase in the pressure of a hydraulic liquid acting on a drive piston such as to displace the drive piston;
  two jaws (13, 14) connected to the housing (2) in a movable manner relative to each other, wherein at least one movable jaw (14) is connected to the drive piston (12) such that, in response to the displacement of the drive piston (12), the jaws (13, 14) will carry out a relative movement for performing compression or cutting,
wherein the conversion mechanism comprises:
  a epicycloidal (planetary) gear connected to the drive shaft and suitable for reducing the rotary motion of the drive shaft;
  a thrust unit comprising a rotating plate, a displaceable but rotatably-locked plate and cam-thrust members arranged between the two facing plates and in rolling contact with rolling tracks thereof, wherein at least one of the rolling tracks is cam-shaped such that the rotation of the rotating plate causes a translational oscillating motion of the translatable plate,
wherein the thrust unit is co-axial with the epicycloidal gear and the rotating plate is connected by means of pins to a train of planets of the epicycloidal gear such as to be rotated in response to the revolution motion of the train of planets.

As the reduction gear and thrust unit are functionally separated and co-axial with each other, the side bulk of the tool is reduced and any side or asymmetrical stress in the motion converting mechanism is avoided. Furthermore, as the stress imparted by the epicycloidal gear (mainly radial contact of the parts), and thrust unit (mainly axial contact of the parts) are simple and balanced, these prove to be practically insensitive to wear. In fact, due to the simple stress system obtained by means of the functional separation and co-axial arrangement of an epicycloidal gear and a thrust unit as defined above, the mechanism parts are less stressed, less subjected to wear and the wear (which is practically inevitable) does not cause further imperfections in the mutual positioning of the parts. Consequently, the motion converting mechanism can be provided with a reduced (also longitudinal) size and has a reduced resistance due to friction. Due to the mechanism insensitivity to imperfection, an increase in the wear of the parts after the tool has been intensely used for a long time will not cause an increase also in the friction and energy consumption resulting therefrom.

In order to better understand the invention and appreciate the advantages thereof, a non-limiting exemplary embodiment thereof will be described below, with reference to the annexed figures, wherein.

With reference to the figures, a hydraulic pressing and cutting tool is generally designated with 1.

The tool 1 comprises a housing 2 having an elongated shape with a handle-shaped central portion 3 and a coupling portion 4 for connection, preferably snap-connection, to an electric accumulator 5 that can be replaced and recharged at the rear end of the tool 1. The housing 2 accommodates, preferably at the handle 3, an electric motor 6 that can be supplied by the accumulator through a supply circuit provided with a switch (not shown in detail), a manual operating push-button 7 acting thereto, which is arranged adjacent to the handle 3.

As the electric motor (which can be made to be relatively slender) is arranged within the housing portion acting as the handle, a reduction is obtained in the overall dimensions, both transversal and longitudinal, of the tool. A converting mechanism 8 is arranged within the housing 2 on the side of the motor 6 opposite the accumulator 5. This converting mechanism 8 is connected to the drive shaft 9 of the motor 6 and is suitable to convert the rotary motion of the drive shaft 9 to a translational oscillating motion of a translatable plate 10. A hydraulic pump 11, which is also accommodated within the housing 2, is connected to the converting mechanism 8 and suitable to carry out, in response to the translational oscillating motion of the translatable plate 10, an increase in the pressure of a pressure fluid acting on an operating piston 12, such as to displace the operating piston 12 from a rest position to a work position.

The tool 1 further comprises a stationary jaw 13 which is rigidly connected to the housing 2 and arranged at a front end of the tool opposite the rear end, as well as a movable jaw 14 that is supported within the housing such as to be capable of sliding relative to the stationary jaw 13. The movable jaw 14 is connected to the operating piston 12 such that, in response to the displacement of the operating piston 12 to the work position, it is moved towards the stationary jaw 13 in order to carry out the pressing or cutting operation. A main return spring 15 acts between the stationary jaw and the operating piston 12, such that the latter is elastically biased to the rest position and the movable jaw 14 to an opened position away from the stationary jaw 13.

According to an important aspect of the invention, the converting mechanism 8 comprises an epicycloidal (planetary) gear 16 that is connected to the drive shaft 9 and suitable for reducing the speed of the rotary motion thereof, as well as a thrust unit 17 which is functionally separated and spaced away from the epicycloidal gear 16. The thrust unit 17 comprises a rotating plate 18, said translatable plate 10 being rotatably locked but axially sliding, and cam-thrust members 19 arranged between the two facing plates 10, 18 and in rolling contact with rolling tracks 10, 21 thereof. At least one of the rolling tracks 20, 21 is cam-shaped, such that the rotation of the rotating plate 18 causes the translational oscillating motion of the translatable plate 10.

Advantageously, the thrust unit 17 is co-axial with the epicycloidal gear 16 and the rotating plate 18 is connected to a train of planets 22 of the epicycloidal gear by means of pins such as to be rotated in response to the revolution motion of the train of planets 22.

As the reduction gear stage and thrust unit stage are functionally separated and co-axial with each other, the side dimensions of the tool are reduced and any side or asymmetrical stress in the motion converting mechanism is avoided. Furthermore, as the stress by the epicycloidal gear 16 (mainly radial contact of the parts), and thrust unit 17 (mainly axial contact of the parts) are simple and balanced, these result to be practically insensitive to wear as compared with known systems being subjected to more complex stress. In fact, due to the simple stress system obtained by means of the functional separation and co-axial arrangement of an epicycloidal gear and a thrust unit as defined above, the mechanism parts are less stressed, less subjected to wear and the wear (which is practically inevitable) does not cause further imperfections in the mutual positioning of the parts. Consequently, the motion converting mechanism can be provided with a reduced (also longitudinal) size and has a reduced resistance due to friction. Due to the mechanism insensitivity to imperfection, an increase in the wear of the parts after the tool has been intensely used for a long time does not cause also an increase in the friction and energy consumption resulting therefrom.

Furthermore, due to the configuration of the thrust unit as described above, the average speed of the center of the cam-thrust member (particularly of a ball) results to be half the average peripheral speed of the rotating plate in the point of contact between the cam-thrust member and rolling track of the rotating plate. Thereby, a full 360° revolution of the rotating plate corresponds to half revolution (180°) of the cam-thrust member about the central axis X of the motion converting mechanism. This entails doubling the gear ratio obtained by means of the epicycloidal gear and however doubling the gear ratio relative to solutions with a thrust unit in which the ball center is stationary. Due to the doubling of the gear ratio during the thrust step, an individual epicycloidal gear having small radial dimensions can be employed. Furthermore, due to the rolling of the cam-thrust members about the main axis X of the thrust unit, one can avoid the requirement of rotating also the translating plate as well as the frictions and inertial effects that such rotation entails.

In accordance with a preferred embodiment, the epicycloidal gear 16 comprises a central pinion 23 (sun), a rotatably locked outer ring with inner teeth 24, and said set of planet gears 22 which are geared with both the central pinion 23 and the ring 24, in which the central pinion, planets and fixed ring are arranged in the same plane and do not perform any axial translational movement (with reference to the respective axes of rotation). This allows carrying out the reduction stage in a longitudinally reduced space.

The central pinion 23 is co-axial with the drive shaft 9, and rotatably integrally coupled thereto, and each of the, preferably three, planet gear wheels 22 is connected to the rotating plate 18 by means of a dragging pin 25 thereof. Furthermore, the planet gear wheels 22 are arranged at a constant angular pitch (120°).

Due to the arrangement of the planet gear wheels and the connection of the latter to the rotating plate that is balanced relative to a central axis X of the mechanism, the undesired side stress and consequently the imperfection in the mutual positioning of the mechanism components is reduced, thus resulting in a reduction in the friction and power consumption, for a given overall dimensions.

Figure 1:
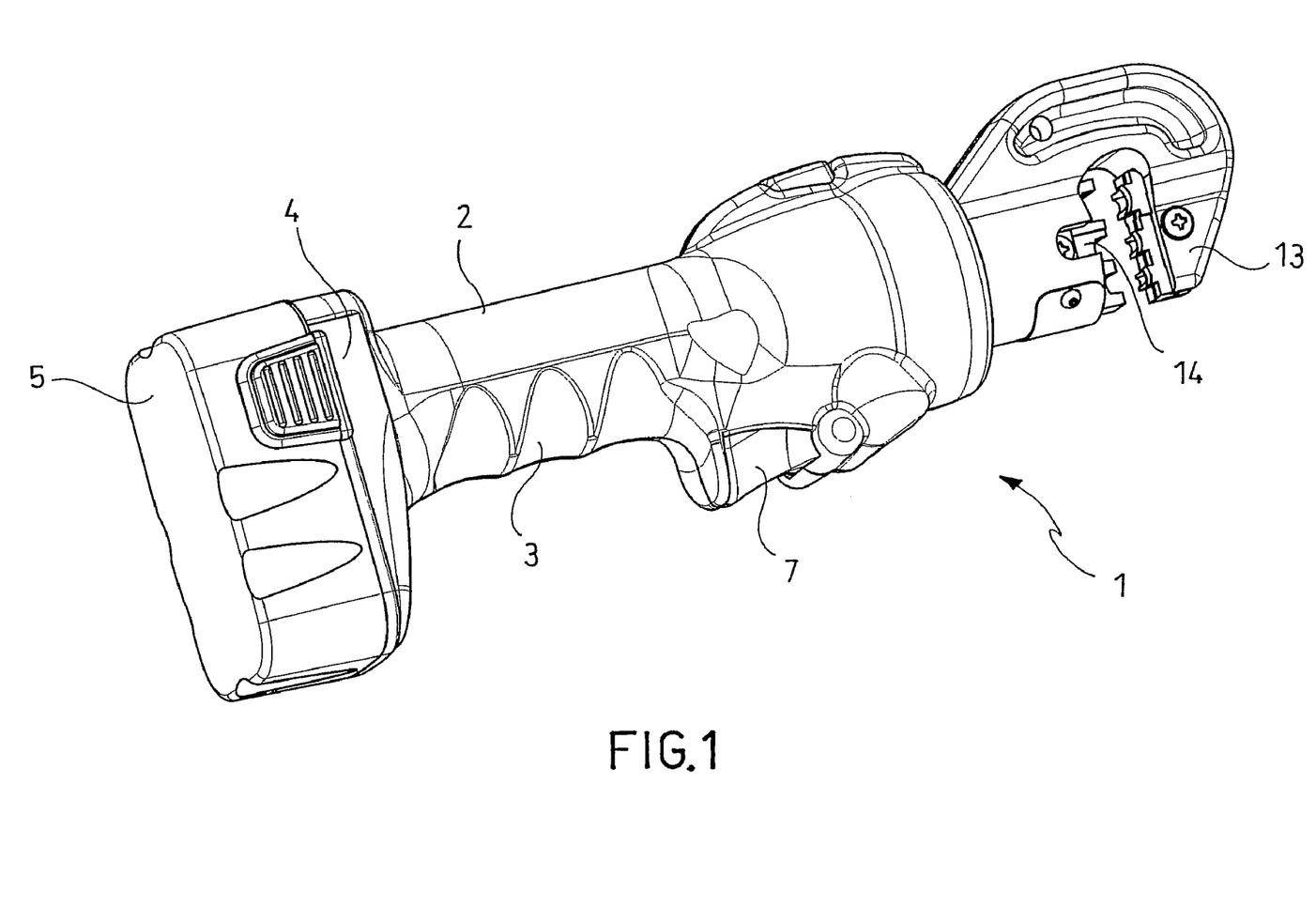
FIG. 1 is a perspective view of a hydraulic pressing and cutting tool according to an embodiment of the invention.
Figure 2:
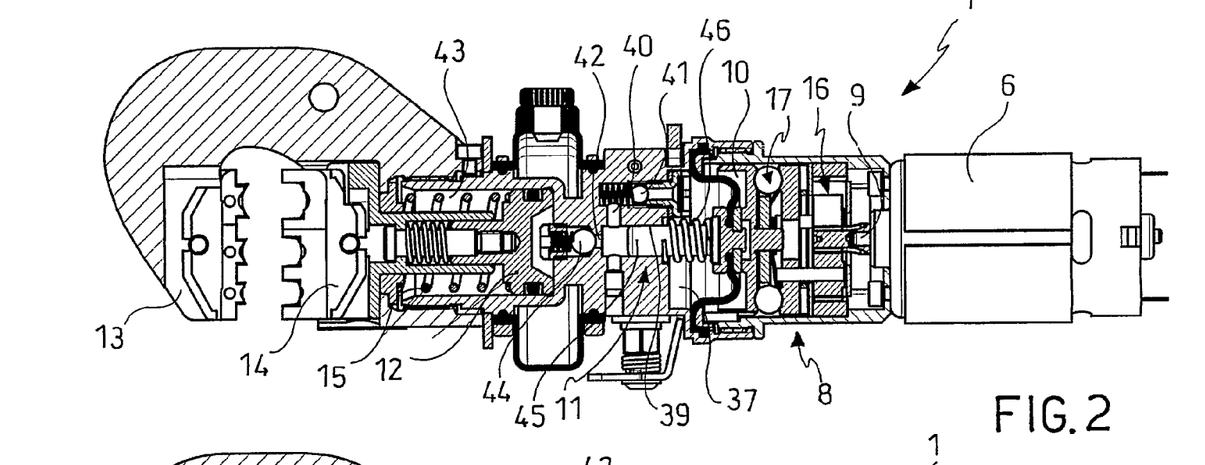
FIG. 2 is a longitudinal sectional view of the tool in FIG. 1 in an open configuration.
Figure 3:
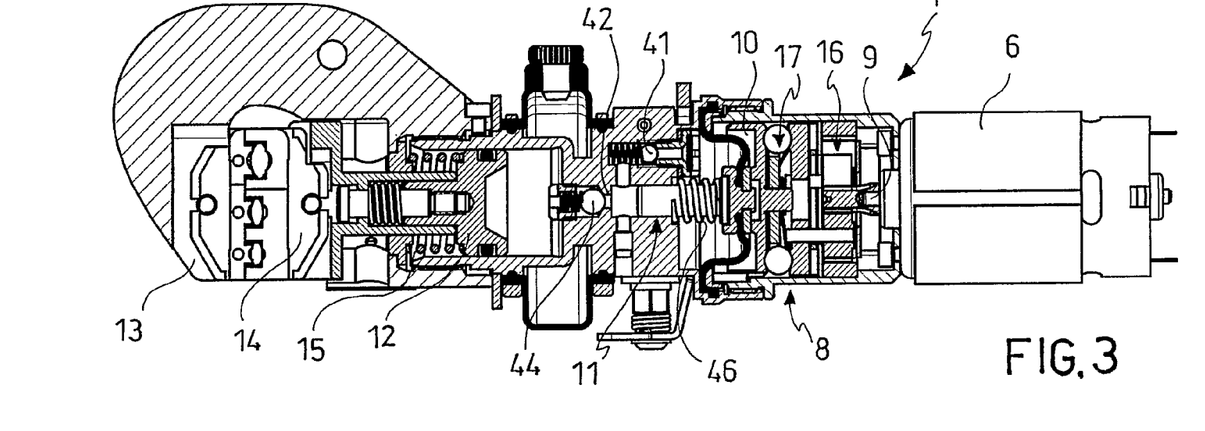
FIG. 3 is a longitudinal sectional view of the tool in FIG. 1 in a closed configuration.
Figure 4:
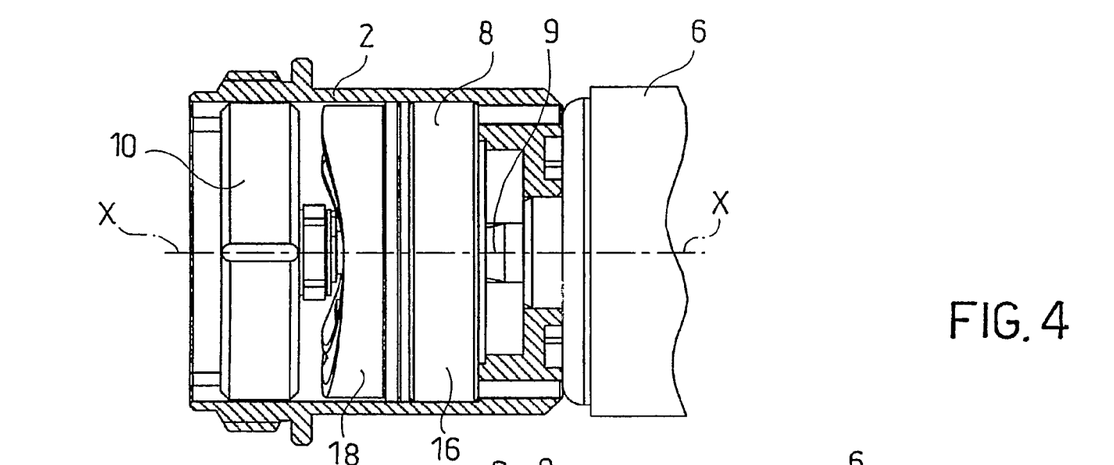
FIGS. 4 and 5 are partial sectional views of a motion converting mechanism of the tool according to the invention.
Figure 5:
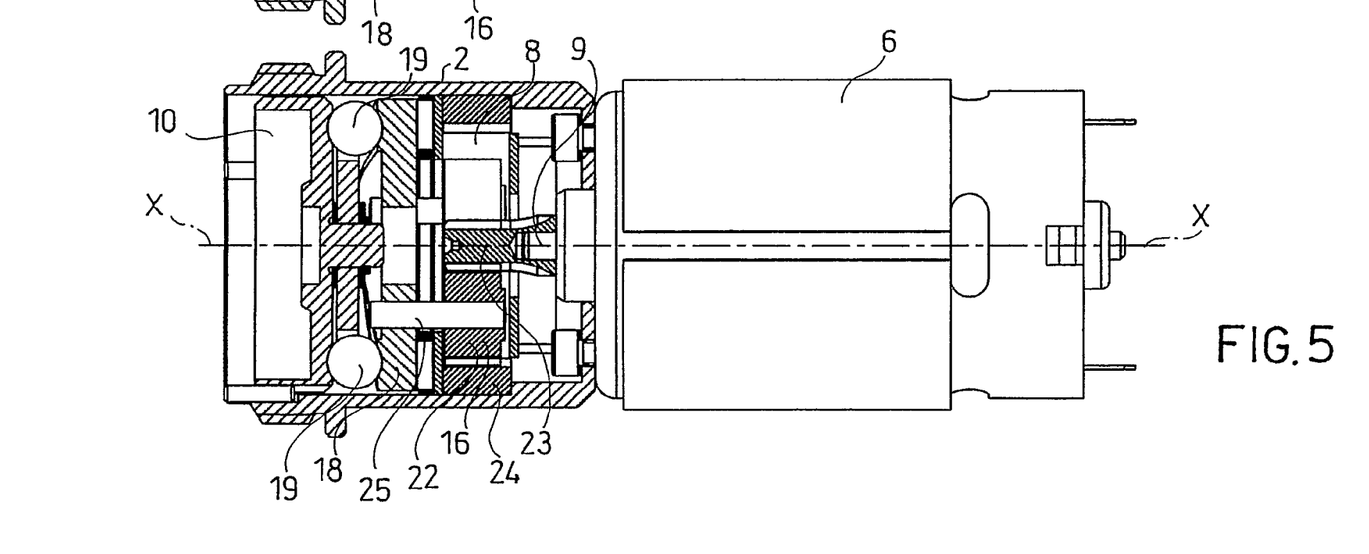
Figure 6:
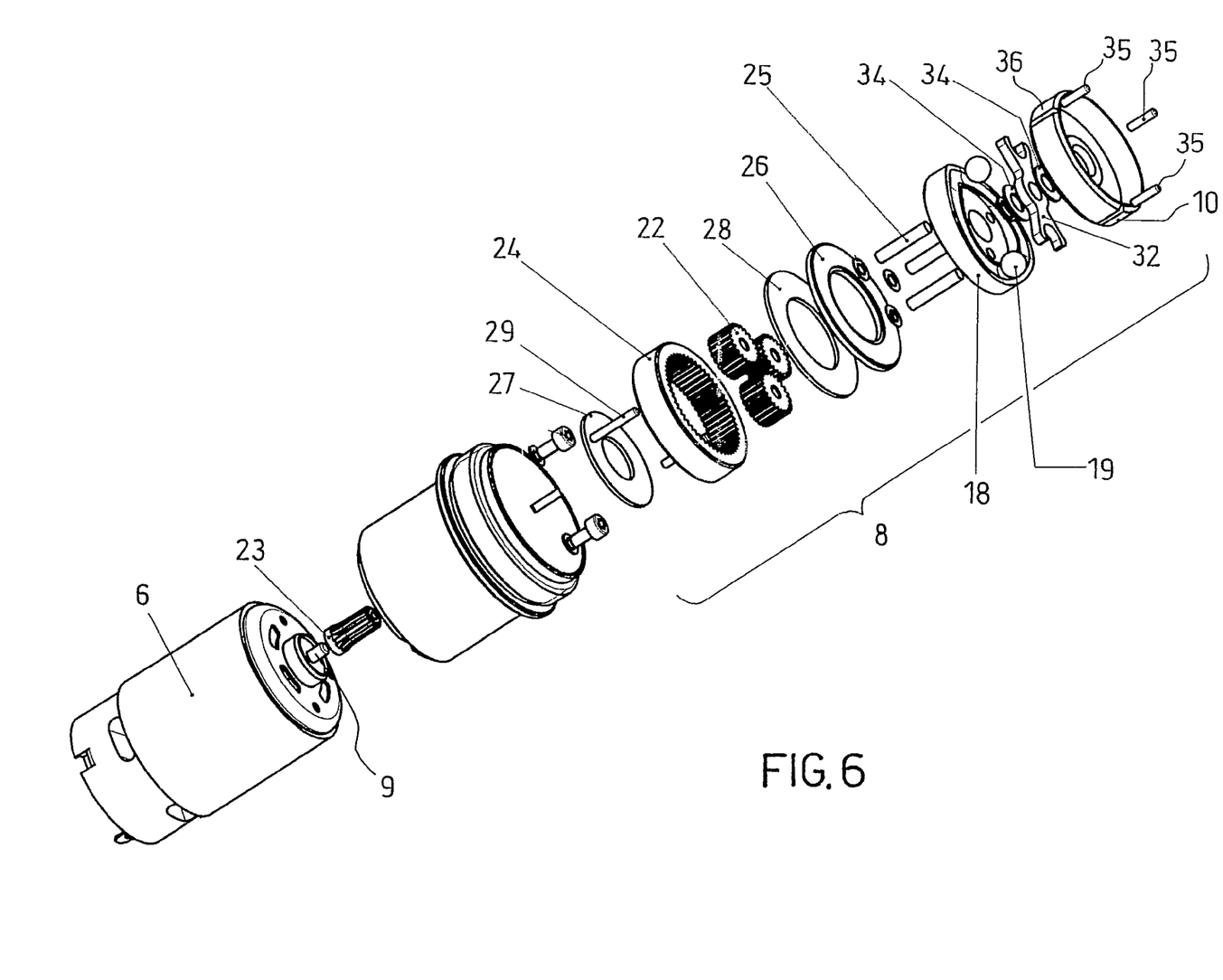
FIG. 6 is an exploded perspective view of the motion converting mechanism in FIG. 5.
Figure 7:
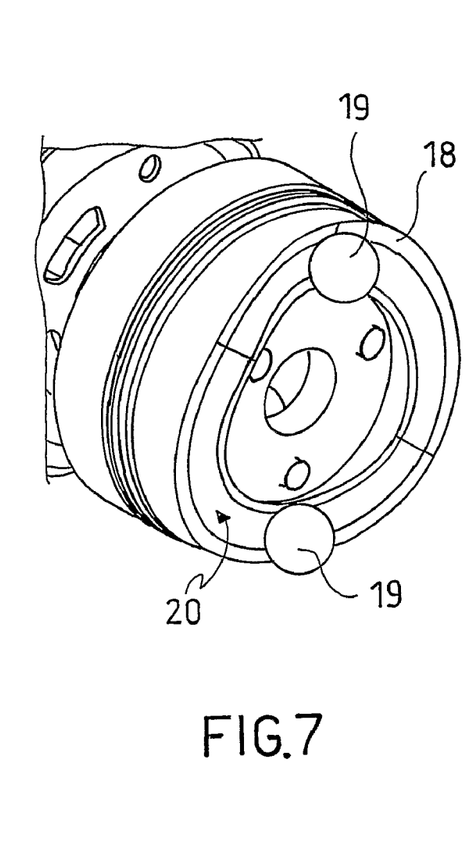
FIGS. 7 and 8 are enlarged perspective views of details of the motion converting mechanism in FIG. 5.
Figure 8:
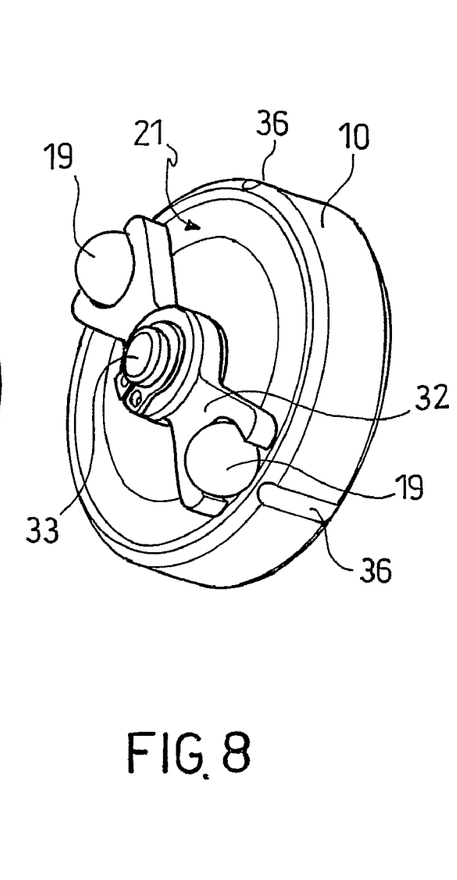
Figure 9:
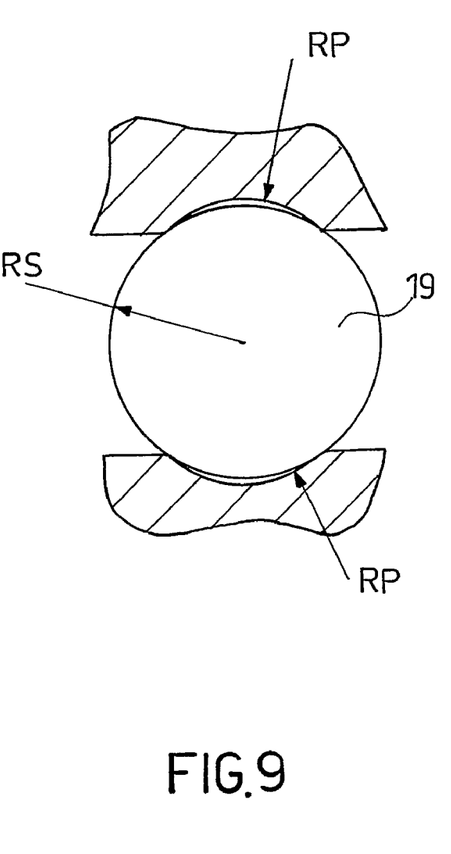
FIG. 9 is a longitudinal sectional view of a detail of the motion converting mechanism in FIG. 5.

In the embodiment illustrated in FIG. 6, the epicycloidal gear 16 is arranged between two opposite containment annular fifth wheels 27, 28, a rear fifth wheel 27 of which separates the epicycloidal gear 16 from the motor and is provided with an anti-rotation plug 29, which is engaged with the ring 24 to prevent the latter from rotating, and a front fifth wheel 28 separating the gear 16 from the adjacent rotating plate 18 of the thrust unit 17.

In order to further reduce the frictions (those which are not strictly required for carrying out the motion conversion) and thus power consumption, an axial bearing 26, preferably an axial roller bearing, can be arranged between the epicycloidal gear, i.e. between the front containment fifth wheel 28, and the rotating plate 18. While the cam rolling track may be formed in the translatable plate or in both plates, according to the preferred embodiment, this cam rolling track 20 is formed in the rotating plate 18 and the rolling track 21 in the translatable plate 10 is substantially planar in the rolling direction of the cam-thrust members 19. Thereby, the translational oscillatory motion is generated in the cam-thrust members during their rolling and revolution motion and transmitted thereby to the translatable plate without undesired tangential force components. Consequently, the sliding friction is advantageously reduced between the translatable plate and the housing.

Figures 10, 11, 12:
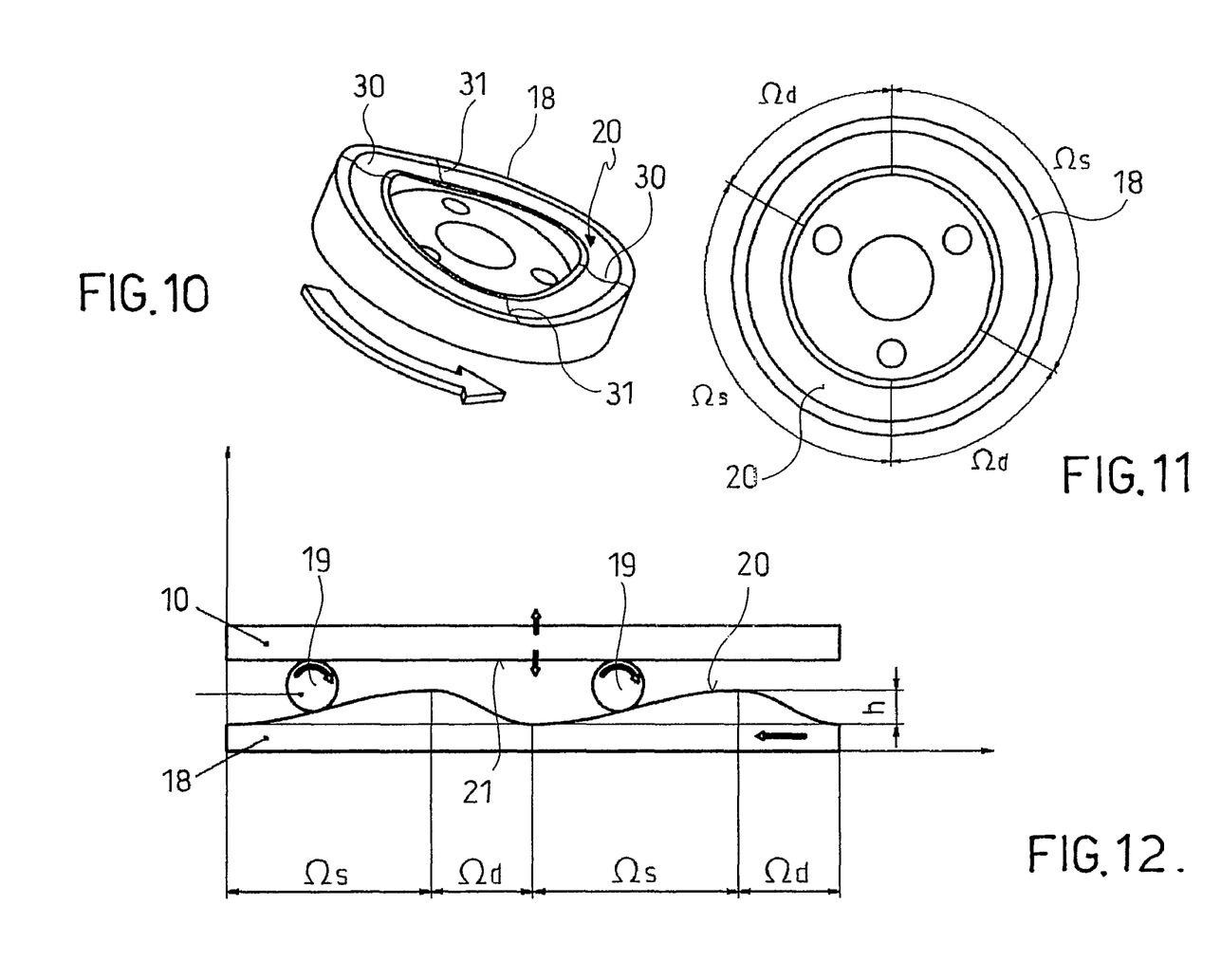
FIG. 10 is a perspective view of a component of the motion converting mechanism in FIG. 5.
FIG. 11 is a front view of the component in FIG. 10.
FIG. 12 is a sectional view of a cam rolling track along the track as developed in a hypothetical development plane.
Figures 13, 14, 15, 16, 17:
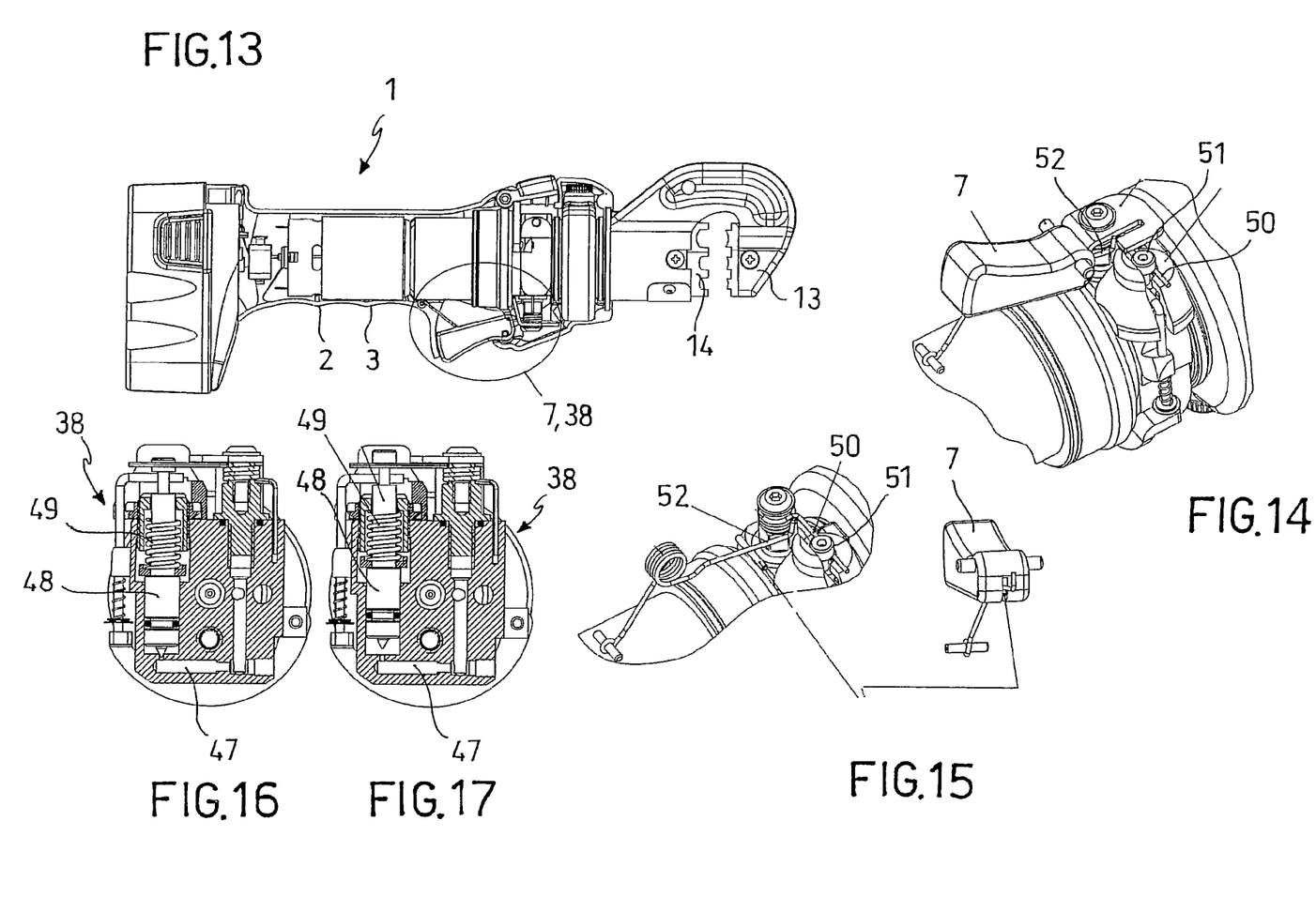
FIG. 13 is a side view of the tool in FIG. 1 (with the housing cut-away) in which a push-button for operating the tool is seen, which interacts with a lock-release mechanism for a pressure relief valve.
FIG. 14 is an enlarged perspective view of the operating push-button with the lock-release mechanism in FIG. 13.
FIG. 15 is an enlarged perspective view of a detail of the operating push-button and lock-release mechanism in FIG. 13.
FIGS. 16 and 17 are sectional views of the pressure relief valve in closed and open configurations.

As illustrated for example in FIG. 12, the cam rolling track 20 has an asymmetrical undulated profile with preferably two diametrically opposite peaks 30 and two diametrically opposite valleys 31, in which the angle of ascent ΩS from a valley 31 to the adjacent peak 30 is lower than the angle of descent ΩD from a peak 30 to the adjacent valley 31 in the rolling direction of the cam-thrust member 19. Thereby, a high movement speed for the motion converting mechanism 8, and thus a rapid work cycle can be obtained, without any risk of the cam-thrust members 19 sliding during the ascent step, which sets an increased resistance to their advancement along the cam rolling track 20.

In order to further increasing the rolling friction between the cam-thrust members 19 and the rolling tracks 20, 21 as desired (to the purpose of being capable of increasing the frequency of the translational oscillating motion and thus the rapidity of the work cycle), the rolling tracks 20, 21 have, in their cross-section transverse relative to the rolling direction, a lower bending radius RP than the bending radius RS of the cam-thrust members 19. This characteristic further results in a perfect adaptation between the cam-thrust member 19 and the rolling track 20, 21 after an inevitable and foreseen mechanical wear of these mechanical components.

Advantageously, the cam-thrust members 19 consist of a set of two balls that are arranged in a diametrically opposite manner with reference to the axis of rotation X of the rotating plate 18.

A positioner 33 partially envelops both balls 19 such as to hold the latter in the diametrically opposite position thereof. The positioner 32 is symmetrical relative to the axis X and pivotally supported by a pin 33 that is co-axial with the axis X and connected to the translatable plate 10. In order to reduce the friction due to the movement of the positioner, the latter is held spaced away from both plates 10, 18 by means of suitable shimming members, such as by means of washers 34.

The translatable plate 10 is slidingly supported within the housing 2 in a guided manner along three parallel guide axes that are circumferentially arranged at a constant 120° angular pitch about the axis of rotation X of the rotating plate 18. The three guide axes are preferably provided by means of three plate-guide small columns 35 parallel to each other, which are engaged in three corresponding grooves 36 formed in a circumferential outer surface of the translatable plate 10.

In accordance with an embodiment, the hydraulic pump 11 comprises a reservoir 37, a cylinder-pump piston unit, a cylinder-operating piston unit, and a pressure relief valve 38.

The cylinder-pump piston unit comprises a cylinder 39 with an intake port 40 connected to the reservoir 37 through a check valve 41 allowing the hydraulic oil to flow from the reservoir 37 to the pumping cylinder 39 and a drain port 42 connected to an operating cylinder 43 of the cylinder-operating piston unit through a check valve 44 which allows the hydraulic oil to flow from the pumping cylinder 39 to the operating cylinder 43. In the pumping cylinder 39 there is accommodated a pump piston 45 that is translationally coupled to the translatable plate 10 and biased by a return spring 46 to an open position corresponding to a withdrawn position of the translatable plate 10.

The cylinder-operating piston unit comprises the operating piston 12 connected to the movable jaw 14 and arranged within the operating cylinder 43.

The pressure relief valve 38 is arranged in a return duct 47 of the fluid, which connects the operating cylinder 43 to the reservoir 37.

Thereby, the translational oscillating motion of the translatable plate 10 causes a translational oscillating motion of the pump piston 45, which pumps the pressure liquid from the reservoir 37 to the operating cylinder 43 to advance the operating piston 12, and along with the latter, the movable jaw 14 from the rest position to the work position until a preset maximum pressure has been reached within the operating cylinder 43. When the maximum pressure has been reached, the pressure relief valve 38 automatically opens the fluid return duct 47 to drain the pressure liquid from the operating cylinder 43 to the reservoir 37 and to allow the operating piston 12 to return to the rest position corresponding to an open position of the jaws 13, 14.

With reference to FIGS. 13 to 18, a preferred embodiment of the pressure relief valve 38 will be described below. It comprises a plug 48 that is biased by a return spring 49 to a closed position in which it stops a passage opening in the fluid return duct 47. The plug 48, return spring 49 and passage opening are configured such that the pressure fluid, after the maximum pressure has been reached, pushes the plug temporarily to an open position, thereby clearing the passage opening. To the purpose of holding the plug 48 in the open position during the backflow of the pressure fluid to the reservoir (because of the pressure drop within the operating cylinder, the return spring 49 would tend to lock the passage opening before the operating piston and movable jaw are returned to the rest/open position) a valve-locking spring 50 is provided, which is suitable to snap-engage an edge 51 of the plug 48 when the latter has reached the open position.

After the operating piston has returned to the rest position, and prior to be capable of starting the subsequent work cycle, the valve-locking spring 50 of the plug 48 is required to be disengaged in order to allow the pressure relief valve to close and another increase in the pressure acting on the operating piston.

To this end, a release spring 52 is provided, which interacts with the operating push-button 7 of the tool, such that, in response to the movement of the operating push-button 7, the release spring 52 disengages the valve-locking spring 50 from the plug 48 such that the latter is allowed to return to the closed position. The push-button 7 interacts, in turn, with an electric switch in the motor supply circuit 6, such as to cause the operation of the motor 6 only when the pressure relief valve is closed.

FIGS. 18A to 18F illustrate the operation of the push-button-pressure relief valve unit.

Figure 18A:
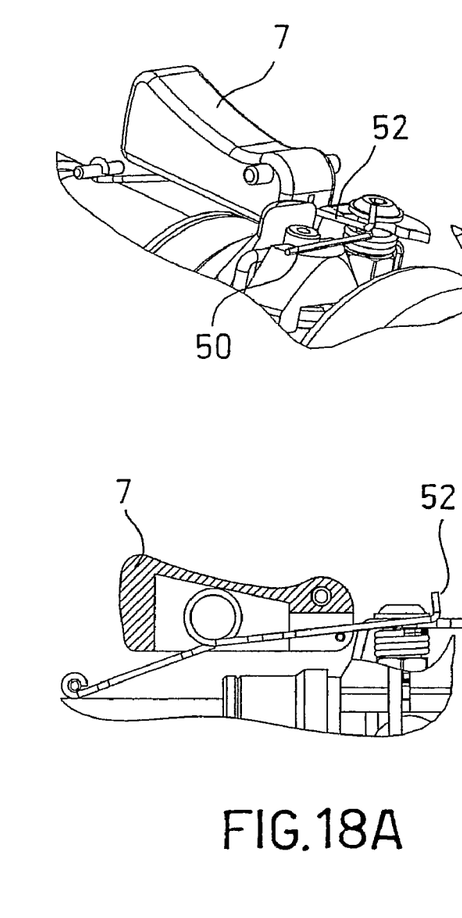
FIGS. 18A to 18F are a sequence of perspective views with an associated sectional view of the lock-release mechanism during a full work cycle of the pressing tool.
Figure 18B:
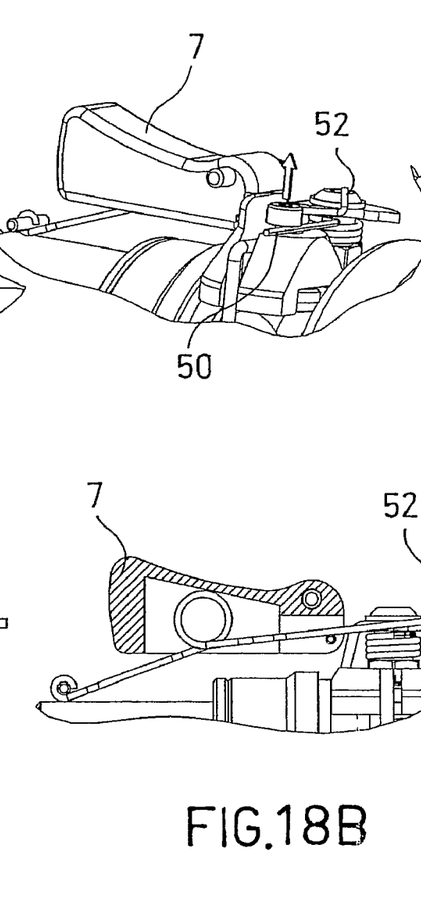
Figure 18C:
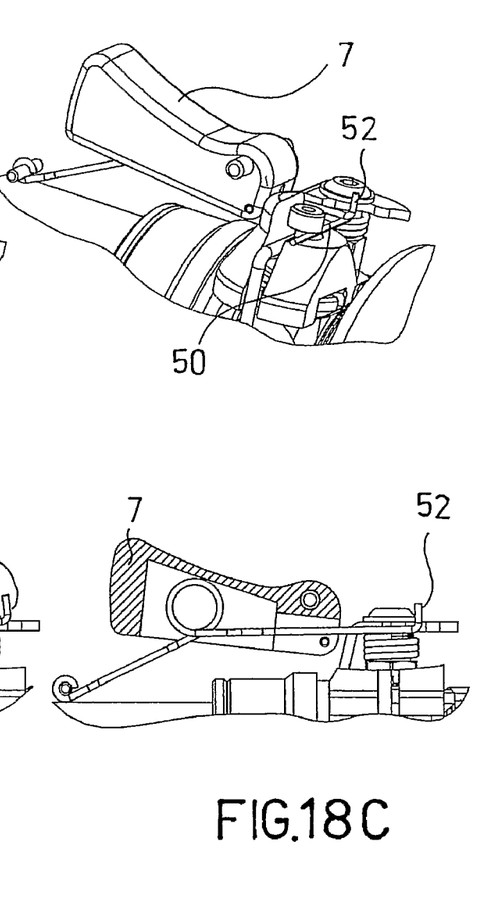

After a work cycle has been completed (pressing or cutting, etc.), the plug 48 of the pressure relief valve is in the open position and is retained therein by the valve-locking spring 50 (FIG. 18A). By acting on the push-button 7, the latter pushes the release spring 52 in contact against the valve-locking spring 50 and moves the latter out of engagement with the edge 51 of the plug 48, which is dragged by the return spring 49 to the closed position (FIG. 18B and FIG. 18C). The release spring 52 is supported and connected to the push-button 7 such that, after the release displacement of the valve-locking spring 50, and in response to a further movement of the push-button 7, the release spring 52 disengages the valve-locking spring 50 to allow the latter to return in pressing abutment against the plug 48 (which is ready for the subsequent snap-engagement). At the end of this step (FIG. 18D) the push-button 7 closes the electric contact which starts the motor and the operating piston starts again its travel.

Figures 18D, 18E, 18F:
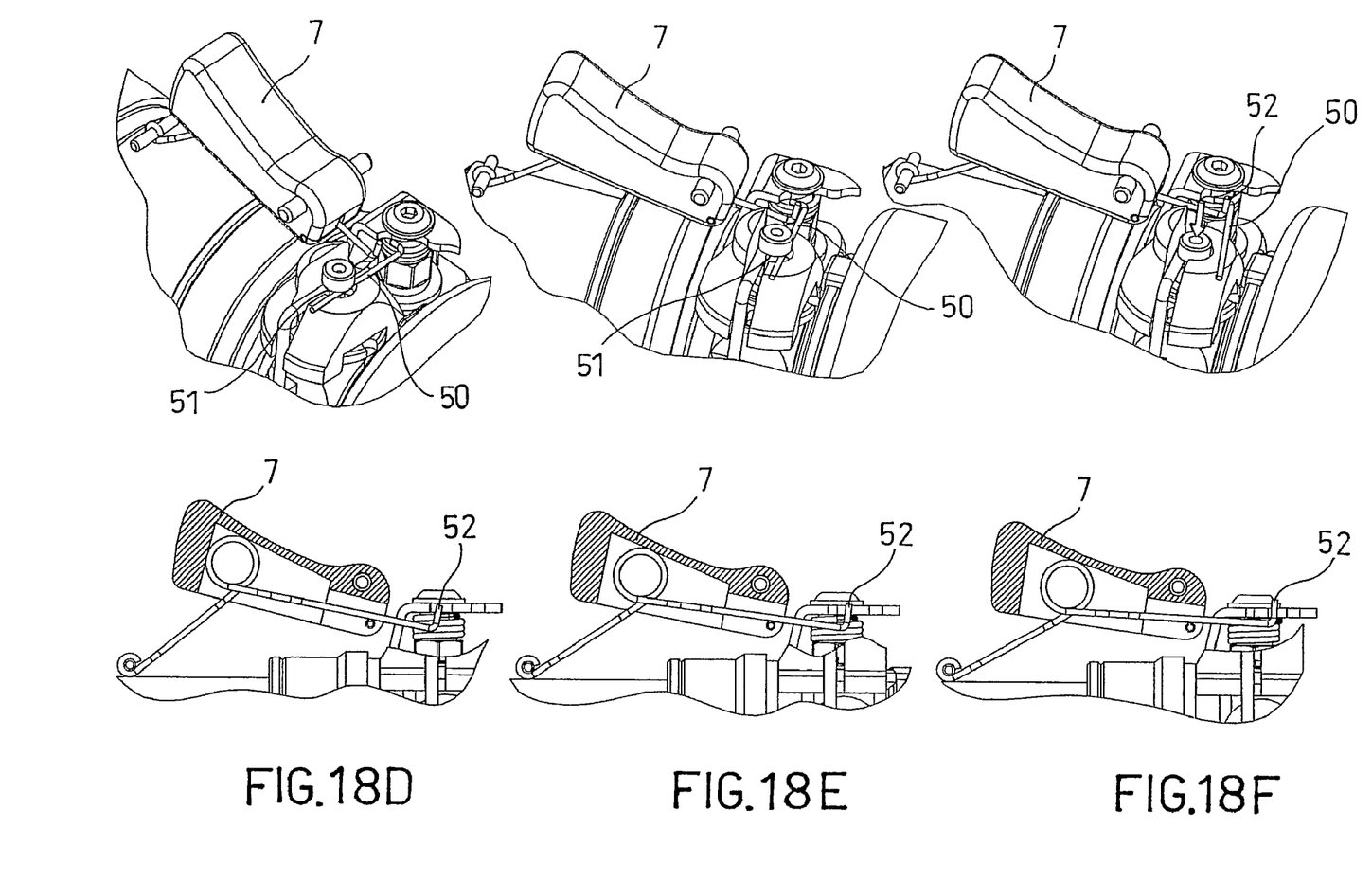

When the maximum pressure has been reached within the operating cylinder (work cycle completed), the plug 48 of the pressure relief valve is moved to the open position, snap-engaged and held by the valve-locking spring 50. The operating piston returns, under the action of the main return spring 15, to the rest position (FIG. 18E). When the push-button 7 is released, the release spring 52 elastically returns to its initial position (FIG. 18F. FIG. 18A)

Figures 19, 20:
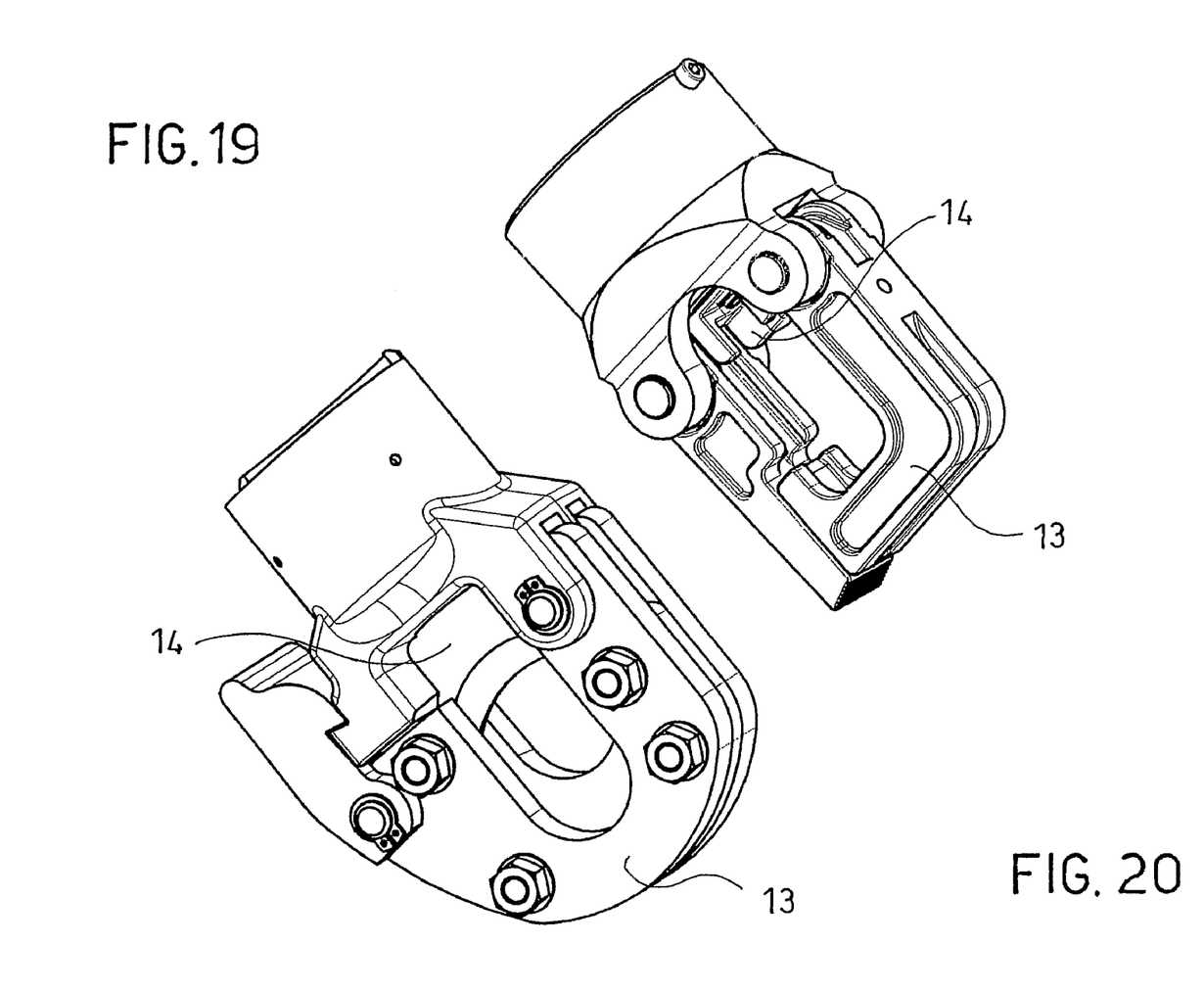
FIGS. 19 and 20 are perspective views of jaws of the tool that are equipped for pressing and cutting functions, respectively.

FIG. 19 shows in detail a movable jaw 14 that is slidingly supported relative to a stationary jaw 13 being integrally connected to the housing. In this embodiment, the jaws are shaped and/or equipped to carry out pressing operations. FIG. 20 shows in detail a movable jaw 14 that is slidingly supported relative to a stationary jaw 13 that is integrally connected to the housing. In this embodiment, the jaws are shaped and/or equipped to carry out cutting operations.

Figure 21:
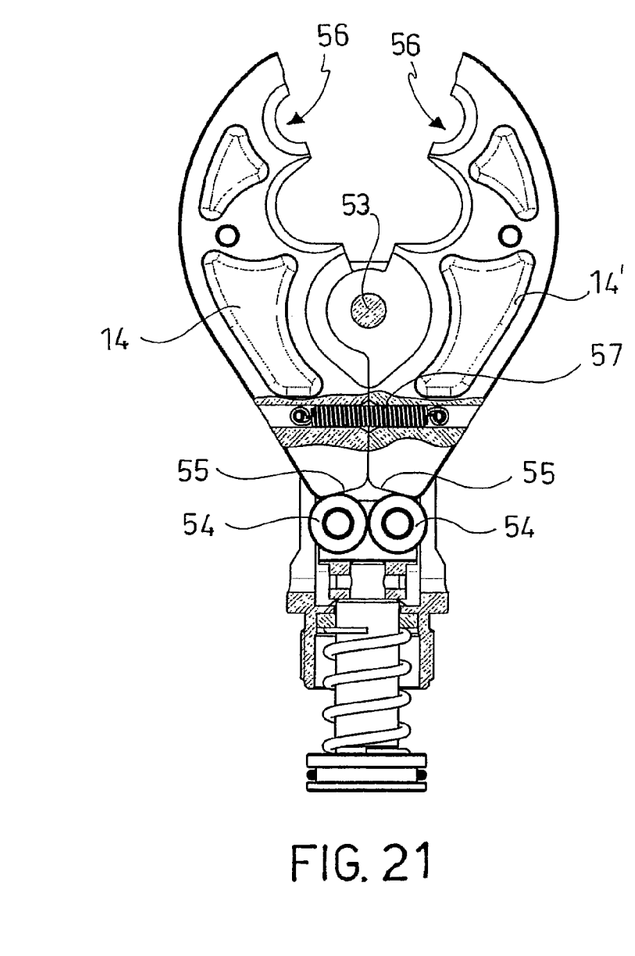
FIGS. 21 and 22 are sectional and perspective partial views of jaws of the tool in accordance with a further embodiment.
Figure 22:
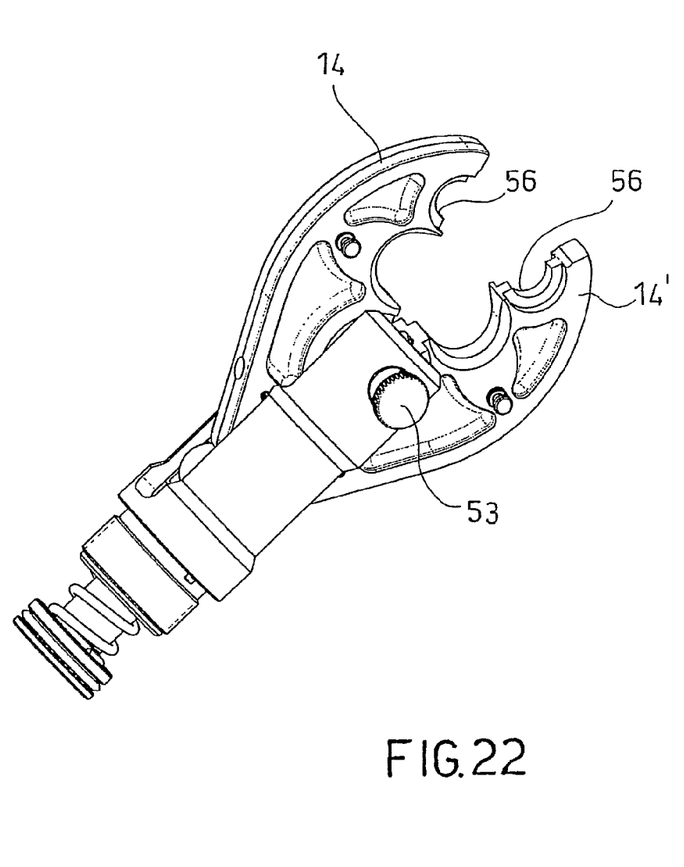

FIGS. 21 and 22 show in detail two movable jaws 14, 14' that are supported by the housing in a pivoting manner relative to each other about a fulcrum in common, which is provided, for example, by means of a pin 53. The operating piston acts by means of suitable movement transmission means, such as a pair of rolls 54, simultaneously on ramp surfaces 55 of both jaws 14, 141 such as to cause the latter to mutually rotate, against the strength of a return spring 57, which results in two active portions 56 moving close to each other, in order to carry out a pressing or cutting operation.

Obviously; to the pressing and/or cutting tool according to the present invention, those skilled in the art, aiming at satisfying contingent and specific requirements, may carry out further modifications and variations, all being however contemplated within the scope of protection of the invention, such as defined in the claims below.

The invention claimed is:

1. A hydraulic pressing and/or cutting tool (1) comprising:
    an electric motor (6) powered by an accumulator (5) and comprising a drive shaft (9);
    a converting mechanism (8) connected to the drive shaft (9) and suitable to convert the rotary motion of the drive shaft (9) to an oscillating translational motion; a hydraulic pump (11) connected to the converting mechanism (8) and suitable to carry out, in response to the oscillating translational motion, an increase in the pressure of a hydraulic fluid acting on a drive piston (12) such as to displace the drive piston (12);
    two jaws (13, 14) connected to the housing (2) in a movable manner relative to each other, of which at least one movable jaw (14) is connected to the drive piston (12) such that, in response to the displacement of the drive piston (12), the jaws (13, 14) carry out a relative movement for performing compression or cutting,
    characterized in that the converting mechanism (8) comprises:
        a epicycloidal gear (16) connected to the drive shaft (9) and suitable for reducing the rotary motion of the drive shaft (9);
        a thrust unit (17) comprising a rotating plate (18), a displaceable but rotatably-locked translatable plate (10) and cam-thrust members (19) arranged between the two facing plates and in rolling contact with rolling tracks (20, 21) thereof, wherein at least one of the rolling tracks (20) is cam-shaped such that the rotation of the rotating plate (18) causes a translational oscillating motion of the translatable plate (10),
    wherein the thrust unit (17) is co-axial with the epicycloidal gear (16) and the rotating plate (18) is connected by means of pins (25) to a train of planets (22) of the epicycloidal gear (16) such as to rotate in response to the revolution motion of the train of planets (22).

2. The tool (1) according to claim 1, wherein the epicycloidal gear (16) comprises a central pinion (23), a stationary-ring (24) with inner teeth, and a set of planetary gear wheels (22) that gear both with the central pinion (23) and the stationary ring (24),
    wherein the central pinion (23) is co-axial with the drive shaft (9) and rotatably integrally coupled thereto, and each planetary gear wheel (22) is connected to the rotating plate (18) by means of a corresponding dragging pin (25).

3. The tool (1) according to claim 1, wherein the epicycloidal gear (16) comprises three planetary gear wheels (22) arranged at a constant 120° angular pitch.

4. The tool (1) according to claim 1, further comprising an axial bearing (26) in contact with the rotating plate (18) and between the epicycloidal gear (16) and the thrust unit (17).

5. The tool (1) according to claim 1, wherein said cam rolling track (20) is formed in the rotating plate (18), and the rolling track (21) of the translatable plate (10) is substantially planar in the rolling direction.

6. The tool (1) according to claim 1, wherein said cam rolling track (20) has an asymmetric undulated profile with two diametrally opposite peaks (30) and two diametrally opposite valleys (31), wherein the angle of ascent (S) from a valley (31) to the adjacent peak (30) is lower than the angle of descent (ΩD) from a peak (30) to the adjacent valley (31) in the rolling direction of the cam-thrust member (19).

7. The tool (1) according to claim 1, wherein a bending radius (RP) of the rolling tracks (20, 21) in a cross-section transverse to the rolling direction is lower than a bending radius (RS) in a cross-section transverse to the rolling direction of the cam-thrust members (19).

8. The tool (1) according to claim 1, wherein the cam-thrust members (19) consist of a set of two balls (19) arranged diametrally opposite with reference to the axis of rotation (X) of the rotating plate (18).

9. The tool (1) according to claim 1, comprising a positioner (32) which at least partially envelops both balls and holds said balls in said diametrally opposite position, said positioner (32) pivotally supported by a pin (33) co-axially connected to the translatable plate (10) and spaced apart from both plates (10, 18) by means of shimming members (34).

10. The tool (1) according to claim 1, wherein the translatable plate (10) is supported in a guided manner along three guide axes (35) circumferentially arranged about the axis of rotation (X) of the rotating plate (18) at a constant 120° angular pitch.

11. The tool (1) according to claim 1, wherein said hydraulic pump (11) comprises:
    said operating piston (12) accommodated within an operating cylinder (43);
    a pumping cylinder (39) having an intake port (40) and a drain port (42) being in non-return communication with the operating cylinder (43);
    a pump piston (45) accommodated within the pumping cylinder (39) and translationally coupled with the translatable plate (10);
    a pressure fluid reservoir (37) in non-return communication with the intake port (40) of the pumping cylinder (39);
    a pressure relief valve (38) arranged in a return duct (47) of the fluid, connecting the operating cylinder (43) to the reservoir (37) to allow the operating piston (12) to return to an opened position of the jaws (13, 14).

12. The tool (1) according to claim 1, wherein said pressure relief valve (38) comprises:
- a plug (48) biased by a return spring (49) to a closed position in which said plug closes a passage opening in the fluid return duct (47),
- said plug (48) configured such that the pressure fluid, after a preset maximum pressure has been reached, pushes the plug (48) temporarily to an open position, thus clearing the passage opening; a valve-locking spring (50) suitable to snap-engage an edge (51) of the plug (48) when the latter reaches the open position and retain the plug (48) in said open position to allow the backflow of the pressure fluid in the reservoir;
- a release spring (52) interacting with an operating push-button (7) of the tool, such that, in response to an operating movement by the push-button (7), the release spring (52) disengages the valve-locking spring (50) from the plug (48) to allow the plug (48) to return to the closed position, wherein said push-button (7) interacts with an electric switch in the motor supply circuit such as to cause the operation of the motor with the pressure relief valve being closed.

13. A motion converting mechanism (8) for a hydraulic pressing and/or cutting tool (1) of the type comprising:
- an electric motor (6) powered by an accumulator (5) and comprising a drive shaft (9);
- a converting mechanism (8) connected to the drive shaft (9) and suitable to convert the rotary motion of the drive shaft (9) to an oscillating translational motion; a hydraulic pump (11) connected to the converting mechanism (8) and suitable to carry out, in response to the oscillating translational motion, an increase in the pressure of a pressure fluid acting on a drive piston (12) such as to displace the drive piston (12);
- two jaws (13, 14) connected to the housing (2) in a movable manner relative to each other, of which at least one movable jaw (14) is connected to the drive piston (12) such that, in response to the displacement of the drive piston (12), the jaws (13, 14) carry out a relative movement for performing compression or cutting,
- characterized in that the motion converting mechanism (8) comprises:
- an epicycloidal gear (16) connected to the drive shaft (9) and suitable for reducing the rotary motion of the drive shaft (9);
- a thrust unit (17) comprising a rotating plate (18), a displaceable but rotatably-locked plate (10), and cam-thrust members (19) arranged between the two facing plates and in rolling contact with rolling tracks (20, 21) thereof, wherein at least one of the rolling tracks (20) is cam-shaped such that the rotation of the rotating plate (18) causes a translational oscillating motion of the translatable plate (10), wherein the thrust unit (17) is co-axial with the epicycloidal gear (16) and the rotating plate (18) is connected by means of pins (25) to a train of planets (22) of the epicycloidal gear (16) such as to rotate in response to the revolution motion of the train of planets (22).

\* \* \* \* \*